JOHN STARK, OF THOMASVILLE, GEORGIA.

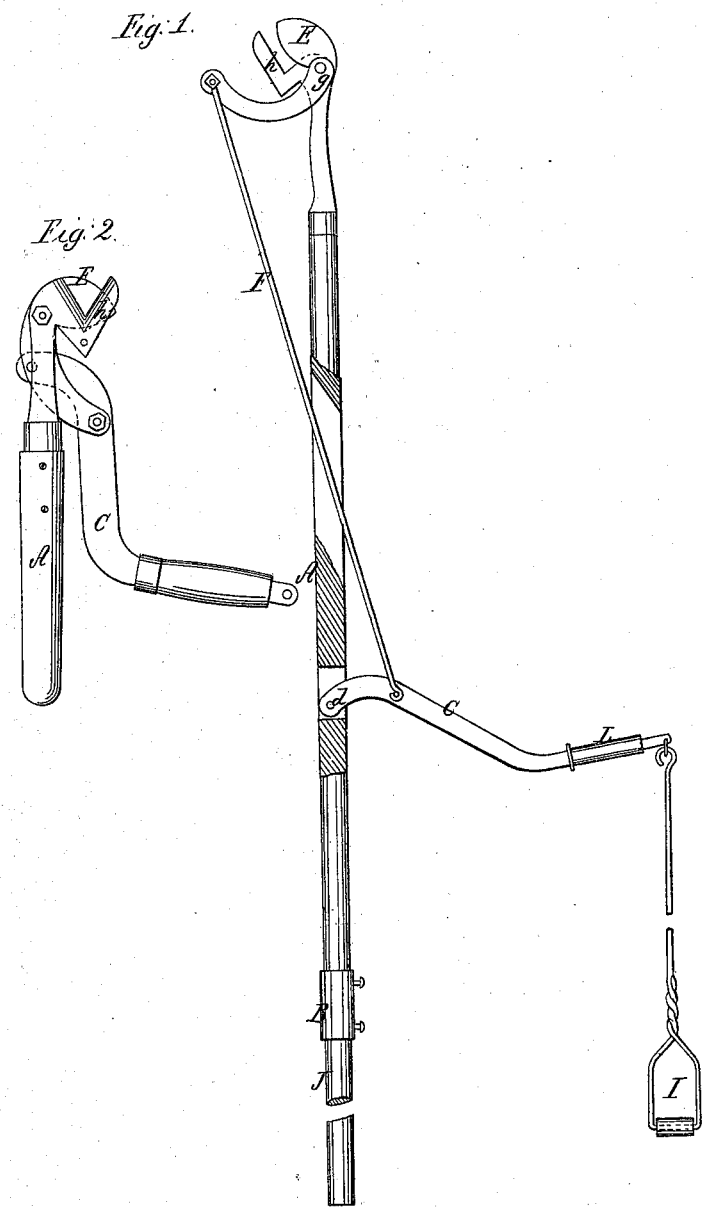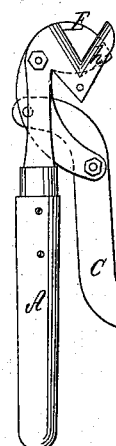

Letters Patent No. 87,719, dated March 9, 1869; antedated February 27, 1869.

IMPROVEMENT IN EXTENSION PRUNING-HOOKS.

The Schedule referred to in these Letters Patent and making part of the same.

*To all whom it may concern:*

Be it known that I, JOHN STARK, of Thomasville, in the county of Thomas, and State of Georgia, have invented a new and useful Improvement in Extension Pruning-Shears; and I do hereby declare that the following is a full, clear, and exact description thereof, which will enable those skilled in the art to make and use the same, reference being had to the accompanying drawings, forming part of this specification.

This improvement relates to lever-shears for pruning fruit and other trees, whereby the shears may be extended so as to be used as either hand or pole-shears; and It consists in shaping and arranging the cutting-edges of the shears so that the cutting of the branch commences at the top side, thus greatly facilitating the operation of pruning; and also in the arrangement of the parts whereby the shears are made convertible from pole to hand-shears, as will be hereinafter more fully described.

The drawing—

Figure 1 represents a longitudinal view of the shears, extended as when used as pole-shears, or for reaching the higher branches.

Figure 2 represents the shears as when used for hand-shears, for light pruning.

Similar letters of reference indicate corresponding parts.

A is the pole, which is made so as to be extended, as seen at the sleeve-coupling B.

C is a lever, which has its fulcrum on the pole at $d$, and which is connected with the lever-end of the movable knife E by the rod F.

The movable cutting-knife E is a lever, which has its fulcrum at $g$, as seen in the drawing.

The shear-blade $h$ is fastened to the pole A.

As represented in the drawing, the pole is extended, and a handle, I, is attached to the lever C, for operating the shears by the power of the foot with a compound-lever purchase.

To change the shears so as to adapt them to hand-use, the shear-blade $h$ is removed from the top of the pole, and inserted into the part of the pole marked J, or into a separate handle.

When thus used, the rod F is dispensed with, and the power is applied by the hand to the handle L of the lever C.

This lever, C, and the lever of the movable knife E, are bolted together, as seen in fig. 2, the two levers, in this instance, forming but a single lever, and consequently operating with less power, but still as powerfully as the ordinary pruning-shears, and sufficiently so for light pruning.

I claim as new, and desire to secure by Letters Patent—

The shear-blade $h$, and the movable cutter E, constructed, arranged, and operating substantially as shown and described, for the purposes set forth.

JOHN STARK.

Witnesses:
ADOLPH HOMEISTER,
JAMES THOSTMAN.